(12) United States Patent
Liu et al.

(10) Patent No.: US 12,143,844 B2
(45) Date of Patent: Nov. 12, 2024

(54) USER EQUIPMENT, BASE STATION, AND METHOD

(71) Applicant: Sharp Kabushiki Kaisha, Sakai (JP)

(72) Inventors: Liqing Liu, Sakai (JP); Shohei Yamada, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 312 days.

(21) Appl. No.: 17/765,603

(22) PCT Filed: Oct. 2, 2020

(86) PCT No.: PCT/JP2020/038218
§ 371 (c)(1),
(2) Date: Mar. 31, 2022

(87) PCT Pub. No.: WO2021/066198
PCT Pub. Date: Apr. 8, 2021

(65) Prior Publication Data
US 2022/0345920 A1 Oct. 27, 2022

(30) Foreign Application Priority Data
Oct. 3, 2019 (JP) .................. 2019-183045

(51) Int. Cl.
*H04W 24/08* (2009.01)
*H04L 27/26* (2006.01)
(Continued)

(52) U.S. Cl.
CPC ....... *H04W 24/08* (2013.01); *H04L 27/26025* (2021.01); *H04L 27/2605* (2013.01); *H04W 72/0446* (2013.01); *H04W 72/23* (2023.01)

(58) Field of Classification Search
CPC ... H04W 24/08; H04W 72/23; H04W 72/044; H04W 72/0446; H04L 27/2602; H04L 27/2605; H04L 27/26025
See application file for complete search history.

(56) References Cited

U.S. PATENT DOCUMENTS

| 2014/0036747 A1* | 2/2014 | Nory | H04W 72/20 370/336 |
| 2017/0164407 A1* | 6/2017 | Yang | H04W 74/0891 |

(Continued)

OTHER PUBLICATIONS

Official Communication issued in International Patent Application No. PCT/JP2020/038218, mailed on Dec. 22, 2020.

(Continued)

*Primary Examiner* — Kevin D Mew
(74) *Attorney, Agent, or Firm* — Keating & Bennett, LLP

(57) ABSTRACT

A method by a user equipment (UE) is described. The method includes transmitting, to a base station, a capability to indicate multiple combinations (X, Y) for PDCCH monitoring, each combination (X, Y) is associated with a respective maximum number of monitored PDCCH candidates, determining spans in which PDCCH is monitored, and each span is a number of consecutive OFDM symbols up to Y, determining, from the multiple combinations (X, Y), one or more combinations (X, Y) in which the value of X is equal to or less than the minimum value of the gap separation of every two consecutive spans, determining, from the one or more combinations (X, Y), a combination (X, Y) with a larger maximum number of monitored PDCCH candidates for PDCCH monitoring.

5 Claims, 9 Drawing Sheets

(51) Int. Cl.
*H04W 72/0446* (2023.01)
*H04W 72/23* (2023.01)

(56) References Cited

U.S. PATENT DOCUMENTS

| | | | | |
|---|---|---|---|---|
| 2019/0150124 | A1* | 5/2019 | Nogami | H04L 5/0044 370/330 |
| 2019/0254025 | A1* | 8/2019 | Lee | H04W 72/0446 |
| 2019/0312671 | A1* | 10/2019 | Lin | H04L 1/0057 |
| 2019/0394772 | A1* | 12/2019 | Li | H04W 72/23 |
| 2020/0169991 | A1* | 5/2020 | Lin | H04W 72/56 |
| 2020/0314678 | A1* | 10/2020 | Lee | H04W 72/12 |
| 2020/0351644 | A1* | 11/2020 | Yang | H04W 72/0446 |
| 2021/0037607 | A1* | 2/2021 | Hamidi-Sepehr | H04W 24/08 |
| 2021/0144687 | A1* | 5/2021 | Hosseini | H04L 1/0038 |
| 2021/0153177 | A1* | 5/2021 | Hosseini | H04W 72/23 |
| 2021/0307039 | A1* | 9/2021 | Bae | H04W 72/1273 |
| 2022/0304015 | A1* | 9/2022 | Yi | H04W 24/08 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.7.0, Sep. 2019, pp. 1-527.

"3rd Generation Partnership Project; Technical Specification Group Radio Access Network; NR; Medium Access Control (MAC) protocol specification (Release 15)", 3GPP TS 38.321 V15.7.0, Sep. 2019, pp. 1-78.

"3rd Generation Partnership Project; Technical Specification Group Radio Access Network; NR; NR and NG-RAN Overall Description; Stage 2 (Release 15)", 3GPP TS 38.300 V15.7.0, Sep. 2019, pp. 1-99.

"3rd Generation Partnership Project; Technical Specification Group Radio Access Network; NR; Physical channels and modulation (Release 15)", 3GPP TS 38.211 V15.7.0, Sep. 2019, pp. 1-97.

"3rd Generation Partnership Project; Technical Specification Group Radio Access Network; NR; Multiplexing and channel coding (Release 15)", 3GPP TS 38.212 V15.7.0, Sep. 2019, pp. 1-101.

"3rd Generation Partnership Project; Technical Specification Group Radio Access Network; NR; Physical layer procedures for control (Release 15)", 3GPP TS 38.213 V15.7.0, Sep. 2019, pp. 1-108.

"3rd Generation Partnership Project; Technical Specification Group Radio Access Network; NR; Physical layer procedures for data (Release 15)", 3GPP TS 38.214 V15.7.0, Sep. 2019, pp. 1-106.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.7.0, Sep. 2019, pp. 1-70.

Spreadtrum Communications, "Discussion on PDCCH enhancements for URLLCc", 3GPP TSG RAN WG1 #98, R1-1910027, Oct. 14-20, 2019, 9 pages.

NTT Docomo Inc., "PDCCH enhancements for URLLC", 3GPP TSG RAN WG1 #98, R1-1909193, Aug. 26-30, 2019, pp. 1-11.

Ericsson, "PDCCH Enhancements for NR URLLC", 3GPP TSG-RAN WG1 Meeting #98, R1-1908121, Aug. 26-30, 2019, 15 pages.

* cited by examiner

```
SearchSpace ::=            SEQUENCE {
    searchSpaceId              searchSpaceId,
    controlResourceSetId       ControlResourceSetId
    monitoringSlotPeriodicityAndOffset  CHOICE {
        ... }
    duration                   INTEGER (2..2559)
    monitoringSymbolsWithinSlot BIT STRING (SIZE (14))
    nrofCandidates             SEQUENCE {
        ... }
    searchSpaceType            CHOICE {
        common                     SEQUENCE {
            dci-Format0-0-AndFormat1-0   SEQUENCE {
                ... }
            dci-Format2-0              SEQUENCE {
                nrofCandidates-SFI         SEQUENCE {
                    ... },
            }
            dci-Format2-1              SEQUENCE {
                ... }
            dci-Format2-2              SEQUENCE {
                ... }
            dci-Format2-3              SEQUENCE {
                ... }
        },
        ue-Specific                SEQUENCE {
            dci-Formats                ENUMERATED {formats0-0-And-1-0, formats0-1-And-1-1},
            ...
        }
    }
}
```

FIG. 2

```
SearchSpace-v16 ::=           SEQUENCE {
    searchSpaceId                 SearchSpaceId,
    controlResourceSetId          ControlResourceSetId
    monitoringSlotPeriodicityAndOffset  CHOICE {
        ...
    }
    duration                      INTEGER (2..2559)
    monitoringSymbolsWithinSlot   BIT STRING (SIZE (14))
    nrofCandidates                SEQUENCE {
        ...
    }
    searchSpaceType-v16           SEQUENCE {
        ue-Specific                   SEQUENCE {
            dci-Formats-v16               ENUMERATED {formats0-0-And-1-0, formats0-2-And-1-2},
            ...
        }
    }
}
```

```
SearchSpace-v16 ::=           SEQUENCE {
    searchSpaceId                 SearchSpaceId,
    controlResourceSetId          ControlResourceSetId
    monitoringSlotPeriodicityAndOffset  CHOICE {
        ...
    }
    duration                      INTEGER (2..2559)
    monitoringSymbolsWithinSlot   BIT STRING (SIZE (14))
    nrofCandidates                SEQUENCE {
        SEQUENCE {
            ...
        }
    }
    ue-Specific-v16
        formats0-2-And-1-2
    ...
}
```

FIG. 3

```
SearchSpace-v16 ::=              SEQUENCE {
  searchSpaceId                  SearchSpaceId,
  controlResourceSetId           ControlResourceSetId
  monitoringSlotPeriodicityAndOffset  CHOICE { ... }
  duration                       INTEGER (2..2559)
  monitoringSymbolsWithinSlot    BIT STRING (SIZE (14))
  nrofCandidates                 SEQUENCE { ... }
  searchSpaceType-v16            CHOICE {
    common                         SEQUENCE {
      dci-Format0-0-AndFormat1-0     SEQUENCE { ...
      }
      dci-Format2-0                  SEQUENCE {
        nrofCandidates-SFI             SEQUENCE { ...
      },        }
      dci-Format2-1                  SEQUENCE { ...
      }
      dci-Format2-2                  SEQUENCE { ...
      }
      dci-Format2-3                  SEQUENCE { ...
      },
      ...},
    ue-Specific                    SEQUENCE {
      dci-Formats                    ENUMERATED {formats0-0-And-1-0, formats0-1-And-1-1},
      ...}
    ue-Specific-v16                SEQUENCE {
      formats0-2-And-1-2             SEQUENCE { ...
      ...}
}
```

FIG. 4

USER EQUIPMENT, BASE STATION, AND METHOD

TECHNICAL FIELD

The present disclosure relates to a terminal apparatus, a base station apparatus, a communication method, and an integrated circuit.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. However, current existing systems and methods may only offer limited flexibility and efficiency for multiple service communication. As illustrated by this discussion, systems and methods according to the prevent invention, supporting frequent PDCCH monitoring opportunities to monitor DCI format within a slot, may improve communication flexibility and efficiency and may be beneficial.

BRIEF DESCRIPTION OF THE DRAWINGS

FIG. 2 is a diagram illustrating a RRC parameter SearchSpace with an information element structure A 200;

FIG. 3 is a diagram illustrating a RRC parameter SearchSpace-v16 with an information element structure B 300;

FIG. 4 is a diagram illustrating a RRC parameter SearchSpace-v16 with an information element structure C 400;

DESCRIPTION OF EMBODIMENTS

Figure 1:
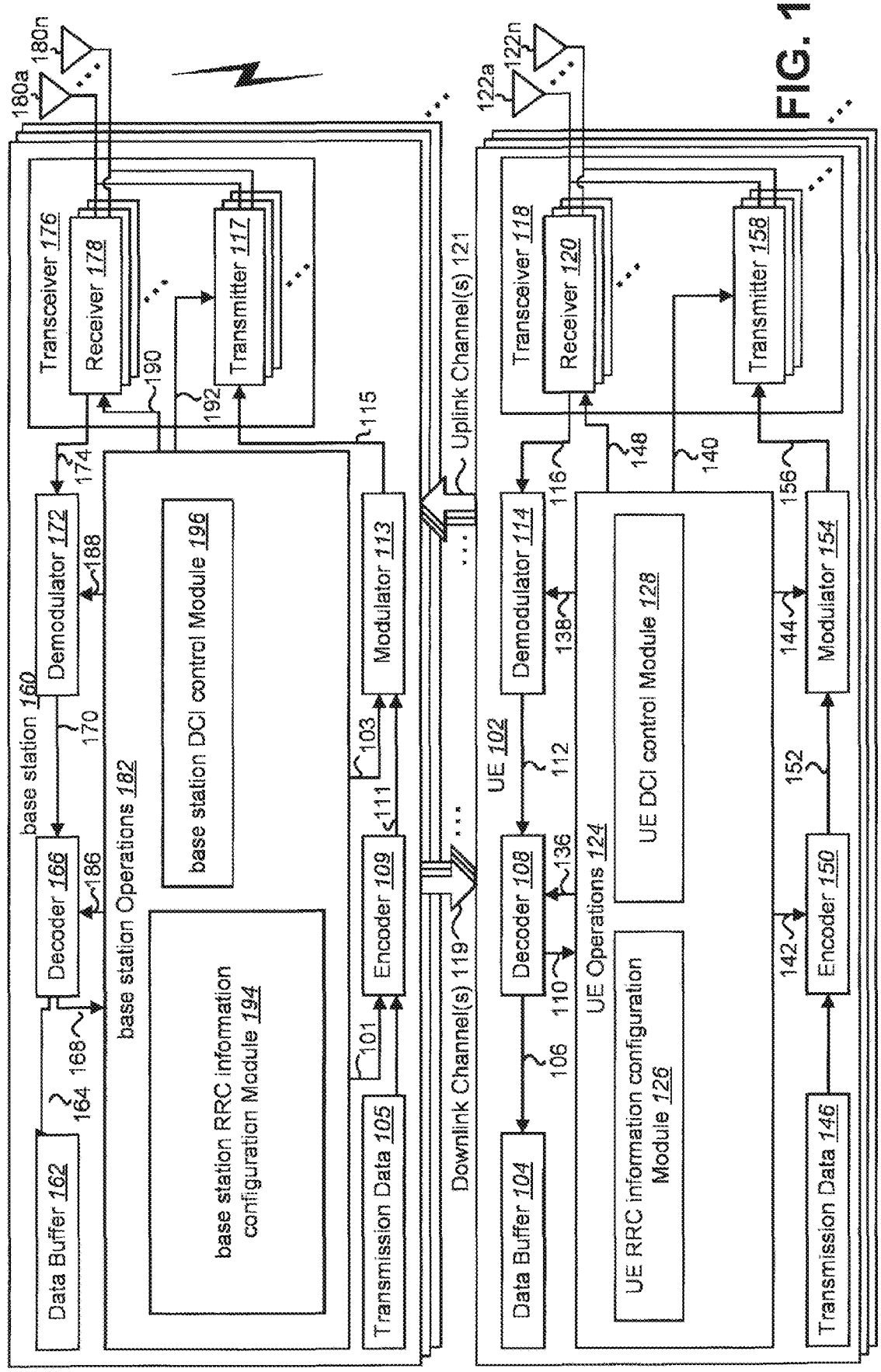
FIG. 1 is a block diagram illustrating one configuration of one or more base stations and one or more user equipments (UEs) in which systems and methods for search space configuration and/or DCI alignment may be implemented.

A method by a user equipment (UE) is described. The method includes receiving, from a base station, a first radio resource control (RRC) parameter to provide search space set configuration, determining PDCCH candidates to be allocated for monitoring in a slot in an ascending order of configured search space set index until a total number of counted PDCCH candidates to be allocated for monitoring in a duration reaches a first number, monitoring the counted PDCCH candidates, wherein for each search space set with the configured search space set index, in a first case that the total number of counted PDCCH candidates do not exceed a first number by counting a number of PDCCH candidates configured for a search space set, the number of PDCCH candidates configured for the search space set is counted to the total number of counted PDCCH candidates, in a second case that the total number of counted PDCCH candidates exceed the first number by counting the number of PDCCH candidates configured for the search space set, the number of PDCCH candidates is counted to the total number of counted PDCCH candidates in an descending order of aggregation level until the total number of counted PDCCH candidates reaches the first number.

A method by a base station is described. The method includes transmitting, to a user equipment (UE), a first radio resource control (RRC) parameter to provide search space set configuration, determining PDCCH candidates to be allocated for monitoring in a slot in an ascending order of configured search space set index until a total number of counted PDCCH candidates to be allocated for monitoring in a duration reaches a first number, transmitting the counted PDCCH candidates, wherein for each search space set with the configured search space set index, in a first case that the total number of counted PDCCH candidates do not exceed a first number by counting a number of PDCCH candidates configured for a search space set, the number of PDCCH candidates configured for the search space set is counted to the total number of counted PDCCH candidates, in a second case that the total number of counted PDCCH candidates exceed the first number by counting the number of PDCCH candidates configured for the search space set, the number of PDCCH candidates is counted to the total number of counted PDCCH candidates in an descending order of aggregation level until the total number of counted PDCCH candidates reaches the first number.

A user equipment (UE) is described. The UE includes reception circuitry configured to receive, from a base station, a first radio resource control (RRC) parameter to provide search space set configuration, control circuitry configured to determine PDCCH candidates to be allocated for monitoring in a slot in an ascending order of configured search space set index until a total number of counted PDCCH candidates to be allocated for monitoring in a duration reaches a first number, reception circuitry configured to monitor the counted PDCCH candidates, wherein for each search space set with the configured search space set index, in a first case that the total number of counted PDCCH candidates do not exceed a first number by counting a number of PDCCH candidates configured for a search space set, the number of PDCCH candidates configured for the search space set is counted to the total number of counted PDCCH candidates, in a second case that the total number of counted PDCCH candidates exceed the first number by counting the number of PDCCH candidates configured for the search space set, the number of PDCCH candidates is counted to the total number of counted PDCCH candidates in an descending order of aggregation level until the total number of counted PDCCH candidates reaches the first number.

A base station is described. The base station includes transmission circuitry configured to transmit, to a user equipment (UE), a first radio resource control (RRC) parameter to provide search space set configuration, control circuitry configured to determine PDCCH candidates to be allocated for monitoring in a slot in an ascending order of configured search space set index until a total number of counted PDCCH candidates to be allocated for monitoring in a duration reaches a first number, transmission circuitry configured to transmit the counted PDCCH candidates, wherein for each search space set with the configured search space set index, in a first case that the total number of counted PDCCH candidates do not exceed a first number by counting a number of PDCCH candidates configured for a search space set, the number of PDCCH candidates configured for the search space set is counted to the total number of counted PDCCH candidates, in a second case that the total number of counted PDCCH candidates exceed the first number by counting the number of PDCCH candidates configured for the search space set, the number of PDCCH candidates is counted to the total number of counted PDCCH candidates in an descending order of aggregation level until the total number of counted PDCCH candidates reaches the first number.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation-Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G-core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more S Cells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new S Cell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:
 Broadcast of System Information related to Access Stratum (AS) and Non Access Stratum (NAS);
 Paging initiated by CN or RAN;
 Establishment, maintenance and release of an RRC connection between the UE and NR RAN including:
  Addition, modification and release of carrier aggregation;
  Addition, modification and release of Dual Connectivity in NR or between LTE and NR;
 Security functions including key management;
 Establishment, configuration, maintenance and release of signaling radio bearers and data radio bearers;
 Mobility functions including:
  Handover;
  UE cell selection and reselection and control of cell selection and reselection;

Context transfer at handover.
QoS management functions;
UE measurement reporting and control of the reporting;
NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:
  C (Cell)-RNTI: unique UE identification used as an identifier of the RRC Connection and for scheduling;
  CS (Configured Scheduling)-RNTI: unique UE identification used for Semi-Persistent Scheduling in the downlink;
  INT-RNTI: identification of pre-emption in the downlink;
  P-RNTI: identification of Paging and System Information change notification in the downlink;
  SI-RNTI: identification of Broadcast and System Information in the downlink;
  SP-CSI-RNTI: unique UE identification used for semi-persistent CSI reporting on PUSCH;
For power and slot format control, the following identities are used:
  SFI-RNTI: identification of slot format;
  TPC-PUCCH-RNTI: unique UE identification to control the power of PUCCH;
  TPC-PUSCH-RNTI: unique UE identification to control the power of PUSCH;
  TPC-SRS-RNTI: unique UE identification to control the power of SRS;
During the random access procedure, the following identities are also used:
  RA-RNTI: identification of the Random Access Response in the downlink;
  Temporary C-RNTI: UE identification temporarily used for scheduling during the random access procedure;
  Random value for contention resolution: UE identification temporarily used for contention resolution purposes during the random access procedure.
For NR connected to 5GC, the following UE identities are used at NG-RAN level:
  I-RNTI: used to identify the UE context in RRC_INACTIVE.

The size of various fields in the time domain is expressed in time units $T_c=1/(\Delta f_{max} \cdot N_f)$ where $\Delta f_{max}=480 \cdot 10^3$ $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where μ and the cyclic prefix for a bandwidth part are obtained from the higher-layer parameter subcarrierSpacing and cyclicPrefix, respectively.

The size of various fields in the time domain may be expressed as a number of time units $T_s=1/(15000 \times 2048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. $N_{slot}^{subframe,\mu}$ is the number of slots per subframe for subcarrier spacing configuration μ. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for search space configuration (or search for PDCCH candidates) and/or DCI size alignment may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE DCI control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameter for search space configurations with different information element structures. The UE DCI control module 128 may determine when and where to monitor or search the configured PDCCH candidates for each search space set based on the processing output from the UE RRC information configuration module 126. The UE DCI control module 128 may further determine PDCCH candidates to be allocated for monitoring in a duration.

The UE operations module 124 may provide the benefit of performing PDCCH candidate search and monitoring efficiently.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station DCI control module 196. The base station operations module 182 may include PHY entities, MAC entities, RLC entities, PDCP entities, and an RRC entity. For example, the base station operation module 196 may determine, for UE(s), when and where to monitor or search the configured PDCCH candidates for each search space set.

The base station RRC information configuration module 194 may generate RRC parameters for search space configurations with different information element structures based on the output from the base station DCI control module 196. The UE DCI control module 196 may further determine PDCCH candidates to be allocated for monitoring in a duration.

The base station operations module 182 may provide the benefit of performing PDCCH candidate search and monitoring efficiently.

The base station operations module 182 may provide information 190 to the one or more receivers 178. For example, the base station operations module 182 may inform the receiver(s) 178 when or when not to receive transmissions based on the RRC message (e.g, broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

Hereinafter, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'. Additionally or alternatively, 'a RRC parameter is (not) provided' may also refer to 'a base station may (not) transmit, to a base station, an RRC message including a RRC parameters'.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCG or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous PRBs, starting from a PRB with the lowest index and ending at a PRB with the highest index among PRBs of a CORESET for Type0-PDCCH CSS set (i.e., CORESET 0), and a SCS and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

A base station may transmit a RRC message including one or more RRC parameters related to CORESET configuration. A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. A RRC parameter ControlResourceSet is used to configure a time and frequency CORESET other than CORESET 0. A RRC parameter ControlResourceSetId included in the ControlResourceSet is CORESET index, used to identify a CORESET within a serving cell.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, or SearchSpace-v16) defines how and where to search for PDCCH candidates. The RRC parameter(s) related to search space configuration (e.g. SearchSpace, SearchSpace-v16) may have different information element structures. 'search/monitor for PDCCH candidate for a DCI format' may also refer to 'monitor/search for a DCI format' for short.

FIG. 2 is a diagram illustrating a RRC parameter (RRC information) SearchSpace with an information element structure A 200.

The RRC parameter SearchSpace with an information element structure A is related to search space configuration. As depicted in FIG. 2, the RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Here, the RRC parameter searchSpaceId is an identity or an index of a search space. The RRC parameter searchSpaceId is used to identify a search space. Or rather, the RRC parameter serchSpaceId provide a search space set index s, 0<=s<40. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

As above-mentioned, the RRC parameter SearchSpace with information element structure A is capable of indicating that the search space set s is a CSS (e.g. a CSS set) or a USS (e.g. a USS set). A base station may configure a UE to whether monitor PDCCH candidates for DCI format 0_0 and DCI format 1_0, or for DCI format 0_1 and DCI format 1_1 in a USS set via the RRC parameter SearchSpace with information element structure A. That is, the base station may not configure a UE to monitor PDCCH candidates for a different DCI format(s) other than the existing DCI format(s) {DCI format 0_0, DCI format 1_0, DCI format 0_1, DCI format 1_1} in the USS set via the RRC parameter SearchSpace with information element structure A. In other words, the UE may, based on the received RRC parameter SearchSpace from the base station, monitor PDCCH candidates either for DCI format 0_0 and DCI format 1_0, or for DCI format 0_1 and DCI format 1_1 in a USS. The UE may be not be configured to monitor PDCCH candidates for a different DCI format(s) other than the existing DCI format(s) {DCI format 0_0, DCI format 1_0, DCI format 0_1, DCI format 1_1} in the USS.

Communication with new service traffic type like (but not limited to) URLLC may require new DCI format(s) design other than the existing DCI formats. For example, some new fields may be introduced in a new DCI format to implement different communication features. For example, some fields included in the existing DCI formats may be not necessary any more to adapt different communication features. In order to implement communication feature with different service traffic types, different DCI formats may be generated according to different service traffic types. Introduction of new DCI format(s) other than the existing DCI formats would be beneficial and efficient for communication with a new service traffic type like URLLC between based station(s) and UE(s). Hence, the RRC parameter SearchSpace with current information element structure A may be problematic, which is incapable of indicating a new DCI format. It would be beneficial to introduce a RRC parameter related to search space configuration with a new information element structure so that the base station may indicate/configure a UE to monitor PDCCH candidates for new DCI format(s) other than the existing DCI formats in a USS.

FIG. 3 is a diagram illustrating a RRC parameter SearchSpace-v16 with an information element structure B 300.

The RRC parameter SearchSpace-v16 with an information element structure B is related to search space configuration. As one example 302, the RRC parameter SearchSpace-v16 with an information element structure B may include a plurality of RRC parameters as like, searchSpaceId, controlResourceSetId, monitoringSlotPeriodicityAndOffset, duration, monitoringSymbolsWithinSlot, nrofCandidates, searchSpace Type. Some of the above-mentioned RRC parameters may be present or absent in the RRC parameters SearchSpace-v16. The searchSpaceType-v16 included in RRC parameter SearchSpace-v16 with an information element structure B may be different from the searchSpaceType included in the RRC parameter SearchSpace with information element structure A. The searchSpaceType-v16 may only indicate that the search space set s is a USS set. The searchSpaceType-v16 may not be used to indicate that the search space set s is a CSS set. The RRC parameter searchSpaceType-v16 may include ue-Specific. The RRC parameter searchSpaceType-v16 may not include common. The RRC parameter searchSpaceType-v16 may also include dci-Format-v16. The dci-Format-v16 may be used to indicate whether the UE monitors PDCCH candidates in the USS for DCI formats 0_0 and 1_0, or for DCI formats 0_2 and 1_2. That is, the dci-Format-v16 may be used to indicate which for DCI formats 0_0 and 1_0, or for DCI formats 0_2 and 1_2, the UE monitors PDCCH candidates in the USS. Additionally or alternatively, the dci-Format-v16 may be used to indicate which for DCI formats 0_0 and 1_0, or for DCI formats 0_1 and 1_1, or for DCI formats 0_2 and 1_2, the UE monitors PDCCH candidates in the USS. Additionally or alternatively, the dci-Format-v16 may be used to indicate which for DCI formats 0_2, or for DCI format 1_2, the UE monitors PDCCH candidates in the USS. Additionally or alternatively, the RRC parameter searchSpaceType-v16 may not include a RRC parameter (e.g. dci-Format-v16). That is, if a USS is configured/provided by the RRC parameter SearchSpace-v16, the UE may implicitly determine to monitor PDCCH candidates in the USS for DCI formats 0_2 and/or 1_2.

As one example 304, the RRC parameter SearchSpace-v16 with an information element structure B may include a RRC parameter ue-Specific-v16. The ue-Specific-v16 is used to configure the search space as a USS set. The RRC parameter SearchSpace-v16 with an information element structure B may not include a RRC parameter common which is used to configure a search space set s as a CSS set. The RRC parameter ue-Specific-v16 may include a RRC parameter formats0-2-And-1-2. The RRC parameter formats0-2-And-1-2 may configure a UE to monitor PDCCH candidates in the USS set for DCI format 0_2 and DCI format 1_2. Additionally or alternatively, the RRC parameter formats0-2-And-1-2 may configure a UE to monitor PDCCH candidates in the USS set for DCI format 0_2 or for DCI format 1_2.

As described in both 302 and 304, the RRC parameter SearchSpace-v16 with an information element structure B is not capable of indicating that the search space set s is a CSS (e.g. a CSS set). The RRC parameter SearchSpace-v16 with an information element structure B is capable of indicating that the search space set s is a USS. As described in 202, the RRC parameter SearchSpace with an information element structure A is capable of indicating that the search space set s is a CSS (e.g. a CSS set) or a USS (e.g. a USS set).

FIG. 4 is a diagram illustrating a RRC parameter SearchSpace-v16 with an information element structure C 400.

The RRC parameter SearchSpace-v16 with an information element structure C is related to search space configuration. As depicted in 402, the RRC parameter SearchSpace-v16 with an information element structure C may include a RRC parameter searchSpaceType-v16. The RRC parameters common, ue-Specific, ue-Specific-v16 included in searchSpaceType-v16, may be used to indicate that the search space set s is a CSS set, a USS set A, or a USS set B, respectively. The USS set A (ue-Specific) may indicate whether a UE monitor for DCI formats 0_0 and 1_0 or for DCI formats 0_1 and 1_1 in the USS set A. A RRC parameter nrofCandidates-v16, which may be included in SearchSpace-v16 but may not be included in ue-Specific, may provide a number of PDCCH candidates per CCE aggregation level L for DCI formats 0_0 and 1_0 or for DCI formats 0_1 and 1_1. The USS set B (ue-Specific-v16) may indicate that a UE may monitor for DCI formats 0_2 and 1_2 in the USS set. Furthermore, the ue-Specific-v16 may further include a RRC parameter nrofCandidates-v16 which may provide a number of PDCCH candidates per CCE aggregation level L for DCI formats 0_2 and 1_2. Hence, The RRC parameter SearchSpace-v16 with an information element structure C is capable of indicating that a search space set is a CSS set, a first USS set (USS set A), or a second USS set (USS set B). The CSS set (common) may indicate that a UE may monitor for DCI formats 0_0 and 1_0 in the CSS set.

According to another example, a RRC parameter searchSpaceType-v16 in 402 may include either a common or a ue-Specific and but may not include ue-Specific-v16. In this case, the RRC parameter dci-Formats included in ue-Specific may indicate whether a UE may monitor PDCCH candidates for DCI format 0_0 and DCI format 1_0, or for DCI format 0_1 and DCI format 1_1, or for DCI format 0_2 and DCI format 1_2 in the USS set. Furthermore, in a case that dci-Formats indicates a UE to monitor PDCCH candidates for DCI format 0_2 and DCI format 1_2, the dci-Formats may further include a RRC parameter nrofCandidates-v16 which may provide a number of PDCCH candidates per CCE aggregation level L for the DCI format 0_2 and DCI format 1_2. Otherwise, the RRC parameter nrofCandidates-v16 may be absent in the dci-Formats.

The RRC parameters as like searchSpaceId, controlResourceSetId, monitoringSlotPeriodicityAndOffset, duration, monitoringSymbolsWithinSlot, nrofCandidates in 302, 304, and 402 may have same usage as those in 202. Some of the above-mentioned RRC parameters may be present or absent in the RRC parameters SearchSpace-v16.

A PDCCH may consist of one or more control channel elements (CCEs). A CCE may consist of 6 resource element groups (REGs). A REG may equal one resource block during one OFDM symbol. The REG within a control-resource set are numbered in increasing order in a time-first manner, starting with 0 for the first OFDM symbol and the lowest-numbered resource block in the control resource set. A UE can be configured with multiple control-resource sets. Each control-resource set is associated with one CCE-to-REG mapping only. The CCE-to-REG mapping for a control-resource set can be interleaved or non-interleaved and is described by REG bundles as in [TS 38.211]. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. A UE may monitor a set of PDCCH candidates in one or more control Resource set (CORESET) on an active DL BWP on an activated cell. Monitoring means decoding each PDCCH candidate according to the monitored DCI formats. The number of CCEs for PDCCH channel estimation may refer to the number of CCEs for PDCCH candidates to be monitored. As mentioned above, a PDCCH candidate may consist of one or more CCEs according to corresponding CCE aggregation level L. That is, a PDCCH candidate per CCE aggregation level L may consist of L CCEs. For example, a PDCCH candidate configured for CCE aggregation level 16 may consist of 16 CCEs.

A set of PDCCH candidates for a UE to monitor is defined in terms of PDCCH search space sets. A PDCCH candidate for a search space set s may correspond to a set of CCEs in a CORESET associated with the search space set s. In the present disclosure, the term "PDCCH search space sets" may also refer to "PDCCH search space". In the present disclosure, the term "search space sets" may also refer to "search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE. In other words, a UE can determine the CCE indexes for aggregation level L corresponding to PDCCH candidates of a USS for a USS set based on the value of C-RNTI addressed to the UE. The UE can determine the CCE indexes for aggregation level L corresponding to PDCCH candidates of a CSS for a CSS set without the value of C-RNTI addressed to the UE.

A UE may monitor a set of PDCCH candidates in one or more of the following search space sets
- a Type0-PDCCH CSS set configured by pdcch-ConfigSIB1 in MIB or by searchSpaceSIB in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSysteminformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI or a TC-RNTI on the primary cell
- a Type2-PDCCH CSS set configured by paging-SearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and
- aUSS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

The UE 102 may receive, from the base station 160, a RRC message including one or more RRC parameters related to search space configuration. The UE 102 may determine PDCCH monitoring occasions for PDCCH candidates for each search space set s based on the received the RRC parameters. The UE 102 may monitor PDCCH candidates for each search space set s in the determined PDCCH monitoring occasions. As above-mentioned, for example, a RRC parameter (e.g. SearchSpace or SearchSpace-v16) may provide the UE 102 for a search space set s, that a PDCCH monitoring periodicity of $k_s$ slots, a PDCCH monitoring offset of $o_s$ slots, a duration of $T_s$, a PDCCH monitoring pattern within a slot, and so on.

Figure 6:
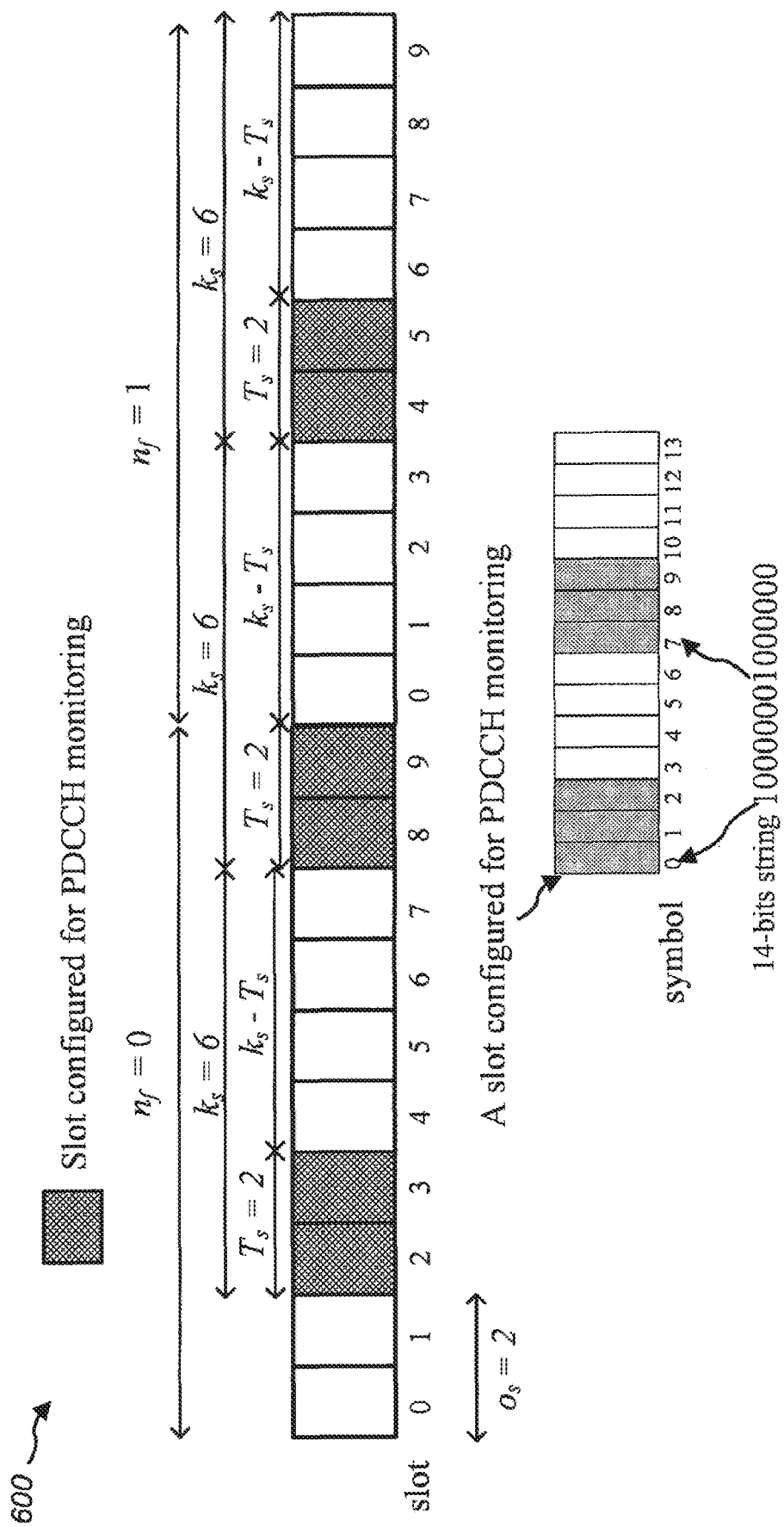
FIG. 6 is a diagram illustrating one example 600 how to determine PDCCH monitoring occasions for PDCCH candidates based on a received RRC parameter(s) related to search space configuration.

FIG. 6 is a diagram illustrating one example 600 how to determine PDCCH monitoring occasions for PDCCH candidates based on a received RRC parameter(s) related to search space configuration.

In FIG. 6, the PDCCH monitoring periodicity $k_s$ is configured as 6 slots. The PDCCH monitoring offset $o_s$ is configured as 2 slots. The duration $T_s$ is configured as 2 slots. The subcarrier spacing configuration u is configured as 0, which means the subcarrier spacing of the active DL BWP is 15 kHz. In this case u=0, $N^{frame,u}_{slot}$ is equal to 10. That is, in a case u=0, the number of slots per frame is 10. $n^u_{s,f}$ is the slot number within a radio frame. That is, the value of $n^u_{s,f}$ is in a range of $\{0, \ldots, N^{frame,u}_{slot}-1\}$.

Figure 7:
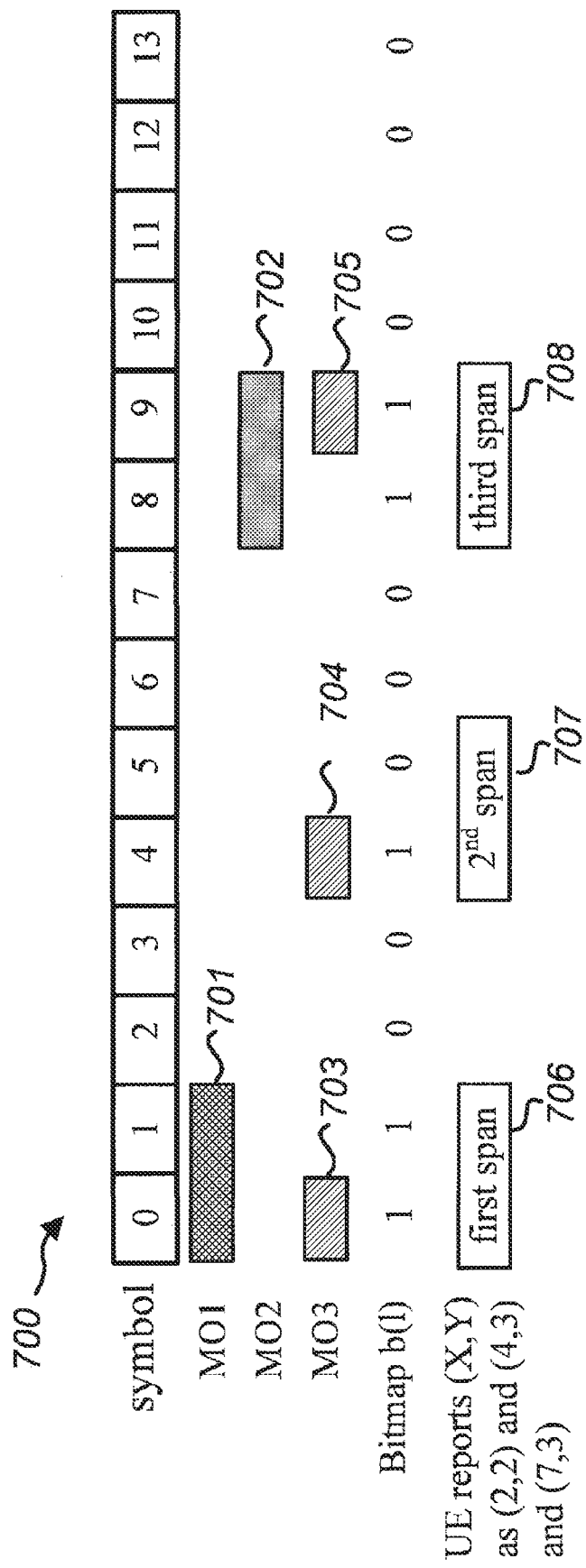
FIG. 7 illustrates one example 700 of PDCCH monitoring span determination.

The UE 102 may determine a PDCCH monitoring occasion on an active DL BWP from the PDCCH monitoring periodicity, the PDCCH monitoring offset, and the PDCCH monitoring pattern within a slot for each configured search space set s. For a search space set s, the UE 102, if the slot with number $n^u_{s,f}$ satisfies Formula (1) $(n_f * N^{frame,u}_{slot} + n^u_{s,f} - o_s) \bmod k_s = 0$, may determine that a PDCCH monitoring occasion(s) exists in a slot with number $n^u_{s,f}$ in a frame with number $n_f$. According to Formula (1), the UE 102 may determine the slots with number $n^u_{s,f}=2$ and $n^u_{s,f}=8$ in a frame with number $n_f=0$ and the slot with number $n^u_{s,f}=4$ in a frame with number $n_f=1$ as the slots in which the PDCCH monitoring occasions exists. Given the $T_s$ is configured as 2 slots, the UE 102 may monitor PDCCH candidates for search space set s for $T_s=2$ consecutive slots, staring from the determined the slots with number $n^u_{s,f}$. In other words, the UE 102 may not monitor PDCCH candidates for search space set s for the next $(k_s-T_s)$ consecutive slots. As depicted in FIG. 7, the UE 102 may determine the slots with number $n^u_{s,f}=2, 3, 8,$ and 9 in a frame with number $n_f=0$ and the slots with number $n^u_{s,f}=4$, and 5 in a frame with number nf*=1 as the slots having PDCCH monitoring occasions. The UE 102 may monitor PDCCH candidates for search space set s in the determined slots configured for PDCCH monitoring. A slot having PDCCH monitoring occasions may also refer to a slot configured for PDCCH monitoring.

Furthermore, a slot determined (or configured) for PDCCH monitoring may have one or more than one PDCCH monitoring occasions. PDCCH monitoring pattern within the slot configured for PDCCH monitoring is indicated by a 14-bits string (monitoringSymbolsWithinSlot). Each bit within the 14-bits string may correspond to a symbol within a slot, respectively. The most significant (left) bit (MSB) may represent the first OFDM in a slot, and the second most significant (left) bit may represent the second OFDM symbol in a slot and so on. The bit(s) set to one may identify the first OFDM symbol(s) of the control resource set within a slot. As depicted in FIG. 6, a slot configured for PDCCH monitoring may have two PDCCH monitoring occasions. The first PDCCH monitoring occasion may be located on the first, second and third consecutive symbols. The second PDCCH monitoring occasion may be located on the $8^{th}$, $9^{th}$, and $10^{th}$ consecutive symbols. The duration of one PDCCH monitoring occasion may be the duration of a CORESET associated with the search space set s.

FIG. 6 is one example about how to determine PDCCH monitoring occasions for a search space set s. As mentioned above, a UE may be configured with more than 1 search space set by the base station via RRC parameter(s) related to search space configuration. These search space sets may be associated with same or different CORESETs. Then, the UE may determine PDCCH monitoring occasions for respective search space set s based on the received RRC parameter(s). PDCCH monitoring occasions can be any OFDM symbols of a slot. Therefore, according to received search space configurations from the base station, PDCCH monitoring occasions for a search space set may or may not overlap or partial overlap with PDCCH monitoring occasions for another search space set in terms of OFDM symbols in time domain.

A UE supporting URLLC traffic may support an increased PDCCH monitoring capability to a base station. The UE supporting the increased PDCCH monitoring capability may report a combination (X, Y) with corresponding a limit C and/or a limit B for a SCS configuration μ. The limit C refers to a maximum number of non-overlapped CCEs for channel estimation per PDCCH monitoring span per SCS configuration μ. The limit B refers to a maximum number of monitored PDCCH candidates per PDCCH monitoring span per SCS configuration μ. Different combination (X, Y) may have a same or a different number of limit C and/or limit B. Same combination (X, Y) with different SCS configuration μ may also have a same or a different number of limit C and/or limit B. The candidate value for combination (X,Y) can be (7,3), (4,3), or (2,2). A UE may report one candidate value for combination (X, Y). Additionally, UE may report one candidates value set for (X, Y). The candidates value set for (X, Y) can be the {(7, 3), (4,3) and (7,3), (2,2) and (4,3) and (7,3)}.

The PDCCH monitoring span is determined at least based on the reported candidate value for (X, Y) or the candidate value set for (X, Y). There is a minimum time separation of X OFDM symbols including the cross-slot boundary case between the start of two different PDCCH monitoring spans. The PDCCH monitoring span is of length up to Y consecutive OFDM symbols of a slot. The PDCCH monitoring spans do not overlap. Every PDCCH monitoring span is contained in a single slot. The same span pattern repeats in every slot. The separation between consecutive spans within and across slots may be unequal but the same (X, Y) limit must be satisfied by all PDCCH monitoring spans. Every PDCCH monitoring occasions is fully contained in one PDCCH monitoring span.

In order to determine a suitable span pattern, first a bitmap b(l), 0<=l<=13 is generated, where b(l)=1 if symbol l of any slot is part of a monitoring occasion, b(l)=0 otherwise. b(l)=1 means the correspond symbol l of any slot is part of a PDCCH monitoring occasion. Alternatively, or additionally, the bitmap b(l) may be generated regardless of the PDCCH monitoring occasion for a common search space set A. That is, the bitmap b(l) may be generated based on the PDCCH monitoring occasions for search space set which are not belong to the common search space set A. The common search space set A may refer to a Type 0-PDCCH CSS set, a Type 0A-PDCCH CSS set, a Type2-PDCCH CSS set, and a Type 1-PDCCH CSS set without dedicated RRC configuration. In other words, if a symbol l is only a part of a PDCCH monitoring occasion for a CSS set in the common search space set A, the b(l) can be regarded as b(l)=0.

The first PDCCH monitoring span in the span pattern begins at the smallest l for which b(l)=1. The next PDCCH monitoring span in the span pattern begins at the smallest l not included in the previous PDCCH monitoring span(s) for which b(l)=1. The PDCCH monitoring span duration is max{maximum value of all CORESET durations, minimum value of Y in the UE reported candidate value} except possibly the last span in a slot which can be of shorter duration. FIG. 7 is an example to illustrate how to determine a span pattern based on UE's reported (X, Y).

FIG. 7 illustrates one example 700 of PDCCH monitoring span determination.

As depicted in FIG. 7, PDCCH monitoring occasion 1 (701) for a search space set is associated with a CORESET with 3-symbol duration. PDCCH monitoring occasion 2 (702) for a search space set is associated with a CORESET with 2-symbol duration. PDCCH monitoring occasion 3 (703, 704, 705) for a search space set is associated with a CORESET with 1-symbol duration. A UE may indicate an increased PDCCH monitoring capability to support the combination (X,Y) as (2,2) and (4,3) and (7,3). The UE may further report a limit C and/or a limit B for the combination (X,Y), respectively. For example, the UE may report a limit C1 and/or a limit B1 for the combination (2, 2). The UE may report a limit C2 and/or a limit B2 for the combination (4, 3). The UE may report a limit C3 and/or a limit B3 for the combination (7, 3).

In FIG. 7, the minimum value of Y in the UE reported candidate value is 2. Therefore, according to the condition that PDCCH monitoring span duration is max{maximum value of all CORESET durations, minimum value of Y in the UE reported candidate value} except possibly the last span in a slot which can be of shorter duration, the PDCCH monitoring span duration is determined as 2. The bitmap b( ) with 14-bits string is generated as {11001000110000} according to the symbols occupied by the PDCCH monitoring occasions in the FIG. 7.

The span pattern is determined based on the bitmap b( ) and the PDCCH monitoring span duration. The first PDCCH monitoring span (706) in the span pattern begins at the symbol #0. The second PDCCH monitoring span (707) in the span pattern begins at the symbol #4. The third PDCCH monitoring span (708) in the span pattern begins at the symbol #8.

In FIG. 7, the UE reports C1, C2 and C3 for (2,2), (4,3) and (7,3), respectively. The UE may determine one limit C out of C1, C2 and C3 for the span pattern. First, the UE may calculate the gap separation between two consecutive spans within the span pattern including cross slot boundary. The gap separation between the first span (706) and the second span (707) is 4 symbols. The gap separation between the second span (707) and the third span (708) is 4 symbols. The gap separation between the last span (third) span (708) and the first span (706) is 6 symbols. Second, the UE may select a minimum value of the gap separation. In FIG. 7, the minimum value of the gap separation is 4 symbols. Third, UE may compare the reported X with the minimum value of the gap separation to select one or more applicable limit C. If the value of the reported X is equal to or less than the minimum value of the gap separation, UE may regard the limit C for the (X, Y) as an applicable limit C the PDCCH monitoring span. That is, both the limit C1 for (2,2) and the limit C2 for (4,3) are applicable for the PDCCH monitoring span. In other words, the applicable limit C set for the PDCCH monitoring span consists of limit C1 and limit C2. Additionally, the UE may or may not remove a limit C from the applicable limit C set if its corresponding Y is smaller than the PDCCH monitoring span duration. Forth, if there are more than one applicable limit C in the applicable limit C set, the UE may select a larger number from the applicable limit C set. The selected limit C is the same across the different PDCCH monitoring spans within a slot. Additionally, the same procedure can be applied to select the limit B.

An objective of the increased PDCCH monitoring capability is to enhance the number of PDCCH monitoring occasions for URLLC and reduce the latency of URLLC traffic scheduling. Therefore, the increased PDCCH monitoring capability can ensure the URLLC UEs to have more frequent opportunities to monitor the DCI formats scheduling the URLLC traffic within one slot. For each PDCCH monitoring span, the limit C can ensure the URLLC UEs to monitor at least one PDCCH candidates. Furthermore, a reasonable configuration of limit C (and/or limit B) may help the URLLC UEs to reduce the complexity and power consumption.

The UE 102 may indicate an increased PDCCH monitoring capability to a base station 160. The base station 160 may configure the UE 102 or schedule the UE 102 according to the signaled UE capability. After receiving the capability information from the UE 102, the base station 160 may configure the UE 102 to use the increased PDCCH monitoring capability. In that case, the UE 102 configured with the increased PDCCH monitoring capability may use the capability to monitor PDCCH candidates. After receiving the capability information from the UE 102, the base station 160 may not configure the UE 102 to use the increased PDCCH monitoring capability. In other words, if a UE is configured with the increased PDCCH monitoring capability, the UE may determine the PDCCH candidates to be monitored per PDCCH monitoring span based on a span-level limit C and/or limit B. If a UE is not configured with the increased PDCCH monitoring capability, the UE may determine the PDCCH candidates to be monitored per slot based on a slot-level maximum number of non-overlapped CCEs and/or a slot-level maximum number of monitored PDCCH candidates. The slot-level maximum number of non-overlapped CCEs or the slot-level maximum number of monitored PDCCH candidates herein can be predefined in 3GPP specification, while the span-level maximum number of non-overlapped CCEs (limit C) or the span-level maximum number of monitored PDCCH candidates (limit B) can be reported by the UE as a capability.

Alternatively, or additionally, the limit B can be determined based on a slot-level maximum number of monitored PDCCH candidates and the number of span within a slot. For example, a remaining number of PDCCH candidates (a slot-level maximum number of monitored PDCCH candidates—the number of PDCCH candidates configured for CSS set in the first duration) can be equally distributed to the spans according to the number of PDCCH monitoring span with in the slot. The limit B for PDCCH monitoring span covering the CSS and USS is the addition of the number of PDCCH candidates configured for CSS set(s) within the PDCCH monitoring span and the distributed remaining number. The limit B for PDCCH monitoring span only covering the USS is the distributed remaining number.

Two PDCCH candidates with different DCI size would be counted separately as two monitored PDCCH candidates. Two PDCCH candidates associated with different CORESETs would be counted separately as two monitored PDCCH candidates. Two PDCCH candidates with same DCI size and identical scrambling using same set of CCEs would be counted as one monitored PDCCH candidates.

Two CCEs for PDCCH candidates are non-overlapped if they correspond to the different CORESET index. Two CCEs for PDCCH candidates are non-overlapped if they correspond to a same CORESET but have different first symbols for the reception of the respective PDCCH candidates. In other words, in a case that two CCEs are overlapping but associated with different CORESET, these two CCEs are counted as two non-overlapped CCEs. In a case that two CCEs are overlapping but associated with same or different search space sets with the same PDCCH starting symbol associated with the same CORESET, these two CCEs are counted as one non-overlapped CCEs. In a case that two CCEs are overlapping but associated with same or different search space sets with the different PDCCH starting symbols associated with the same CORESET, these two CCEs are counted as two non-overlapped CCEs. In a case that two CCEs are not overlapping, these two CCEs are counted as two non-overlapped CCEs.

Figure 5:
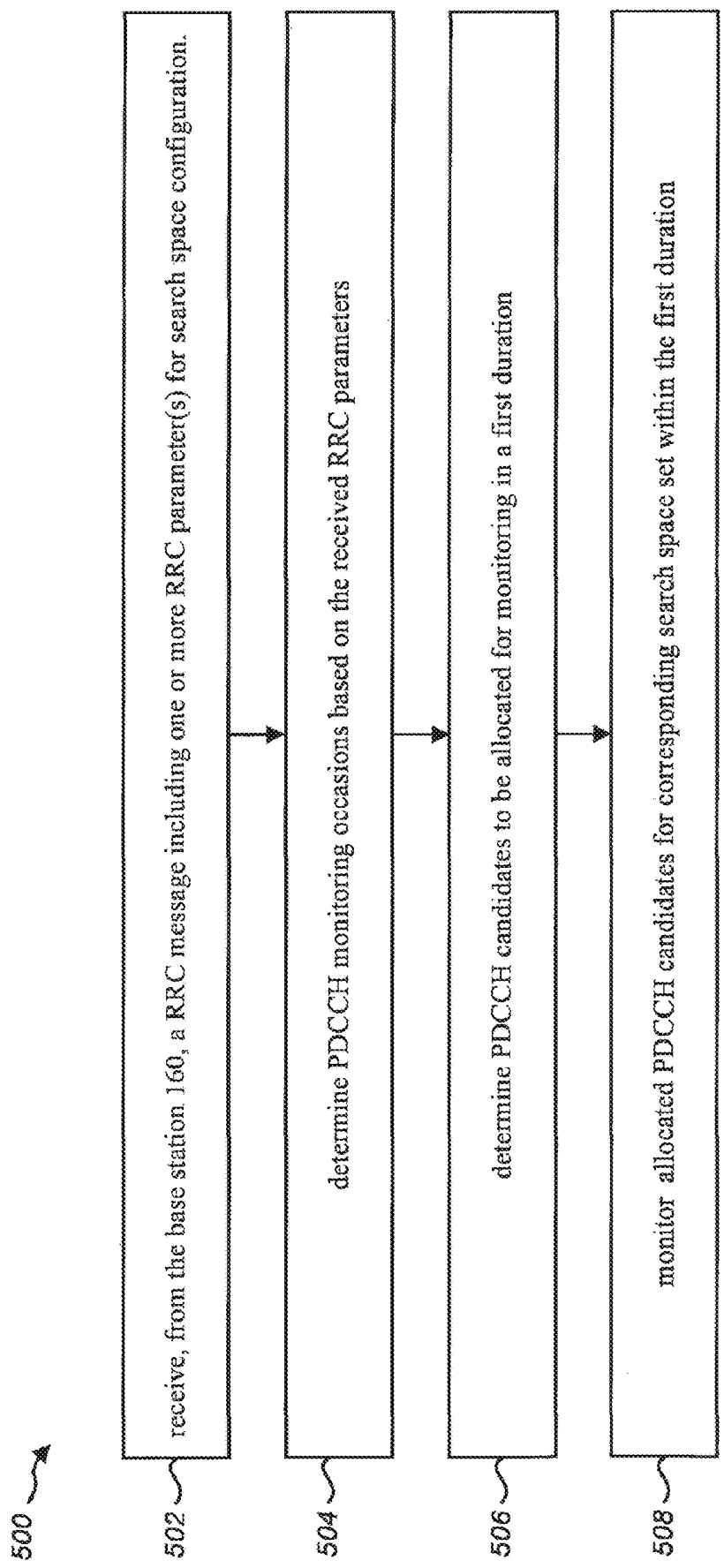
FIG. 5 is a flow diagram illustrating one implementation of a method 500 for determining PDCCH candidates to be monitored by a UE 102.

FIG. 5 is a flow diagram illustrating one implementation of a method 500 for determining PDCCH candidates to be monitored by a UE 102.

The UE 102 may receive 502, from the base station 160, a RRC message including one or more RRC parameter(s). The one or more RRC parameters can be used to configure a search space set s, respectively. The one or more RRC parameters, which provide search space set configuration, define the UE 102 how or where to search for PDCCH candidates.

The UE 102 may, based on the received RRC parameters, determine to monitor PDCCH candidates for a DCI format in respective CSS or USS set. Here, the DCI format determined (or configured) to be monitored for a search space set may be the DCI format 0_1 and/or DCI format 1_1. The DCI format determined (or configured) to be monitored for a search space set may be the DCI format 0_2 and/or DCI format 1_2. The DCI format determined (or configured) to be monitored for a search space set may be the DCI format 0_0 and/or DCI format 1_0.

At 504, the UE 102 may be provided a search space set index s for each configured search space set. At 504, the UE 102 may be provided an association between a search space set s and a CORESET p. At 504, the UE 102 may be provided a number of PDCCH candidates per CCE aggregation level L for each configured search space set s. At 504, the UE 102 may determine PDCCH monitoring occasions for each configured search space sets.

The UE 102 may perform 506 to determine PDCCH candidates to allocated for monitoring based on in a first duration. The first duration may be a slot or a monitoring span according to whether the UE is configured with the increased PDCCH monitoring capability. The UE 102 may determine PDCCH candidates for which search space set(s) to be allocated for monitoring per slot or per monitoring span. The UE 102 may not monitor all the PDCCH candidates configured for all search space sets within a first duration due to the maximum number of the non-overlapped CCEs and/or the maximum number of monitored PDCCH candidates. The UE 102 may determine PDCCH candidates to be allocated for monitoring in the first duration until a total number of counted PDCCH candidates to be allocated for monitoring and/or a total number of the counted non-overlapped CCEs for monitoring in the first duration reaches a first number and/or a second number. The first number is a maximum number of monitored PDCCH candidates that the UE 102 can monitor in the first duration. The second number is a maximum number of non-overlapped CCEs that the UE 102 can monitor in the first duration. Herein, if the first duration is determined as a slot, the first number is a slot-level maximum number of monitored PDCCH candidates per slot and the second number is a slot-level maximum number of non-overlapped CCEs per slot. If the first duration is determined as a PDCCH monitoring span, the first number is a span-level maximum number of monitored PDCCH candidates (e.g. limit B) and the second number is a span-level maximum number of non-overlapped CCEs (e.g. limit C).

A counted PDCCH candidate refers to a PDCCH candidate to be allocated for monitoring for a search space set. The UE 102 may monitor the counted (e.g. allocated) PDCCH candidates in the first duration. The UE 102 may not monitor the uncounted (e.g. unallocated) PDCCH candidates in the first duration. The UE may monitor PDCCH in a search space set with allocated (counted) PDCCH candidates for monitoring in the first duration. The UE 102 may not monitor PDCCH in a search space set without allocated (counted) PDCCH candidates for monitoring in the first duration.

Next, an implementation on how to allocate or count the PDCCH candidate for monitoring and the number of non-overlapped CCEs for monitoring for a search space set is illustrated.

As above-mentioned, the first duration may be a slot or a PDCCH monitoring span (or monitoring span). In a case that the UE 102 is configured with the increased PDCCH monitoring capability, the first duration may refer to the monitoring span. In this case, the counting of the PDCCH candidates and the counting of the non-overlapping CCEs may be performed per PDCCH monitoring span. In a case that the UE 102 is not configured with the increased PDCCH monitoring capability, the first duration may refer to a slot. In this case, the counting of the PDCCH candidates and the counting of the non-overlapping CCEs may be performed per slot.

The maximum number of PDCCH candidates per slot may be different from that per monitoring span. The maximum number of non-overlapping CCEs per slot may be different from that per monitoring span. As mentioned above, the maximum number of monitored PDCCH candidates per slot may be a predefined value in 3GPP specification. The maximum number of non-overlapped CCEs per slot may be a predefined value in 3GPP specification. The maximum number of PDCCH candidates per monitoring span (limit B) and the maximum number of non-overlapped CCEs per monitoring span (limit C) can be reported by the UE 102, respectively.

For each slot or each PDCCH monitoring span, the base station 160 may not configure the UE 102 that the total number of PDCCH candidates configured for all CSS sets and the total number of non-overlapped CCEs configured for all CSS sets exceed the corresponding maximum numbers. That is, the total number of PDCCH candidates configured for all CSS sets per slot or per PDCCH monitoring span may be equal to or less than the maximum number of monitored PDCCH candidates per slot or per PDCCH monitoring span. The total number of non-overlapped CCEs configured for all CSS sets per slot or per monitoring span may be equal to or less than the maximum number of non-overlapped CCEs per slot or per PDCCH monitoring span. The UE 102 may allocate (count) all the PDCCH candidates configured for all the CCS sets for monitoring. The UE 102 therefore may not drop PDCCH candidates configured for the CSS sets for monitoring.

As mentioned above, all the PDCCH candidates configured for the CSS sets are determined as the counted PDCCH candidates for monitoring. Then the UE 102 may determine PDCCH candidates to be allocated for monitoring for each USS set. Note that, before the UE 102 start to determine PDCCH candidates to be allocated for monitoring for each USS set in the first duration, a total number of counted PDCCH candidates is set to the number of PDCCH candidates configured for the CSS set(s) if the CSS set(s) exist in the first duration. If there are no CSS set(s) in the first duration, the total number of counted PDCCH candidates starts from 0. Similarly, a total number of counted non-overlapped CCEs is set to the number of non-overlapped CCEs required by the PDCCH candidates configured for the CSS set(s). If there are no CSS set(s) in the first duration, the total number of counted non-overlapped CCEs starts from 0.

For a UE 102 not configured with the increased PDCCH monitoring capability, the UE 102 may determine to allocate the PDCCH candidates for monitoring per slot. For all USS sets within a slot, the UE 102 may arrange each USS set in a set of USS sets (e.g. set A) in an ascending order of the USS set index. The location of respective USS set in the set of USS sets is according to respective USS set index. For example, the USS set with the lowest USS set index may locate in the first location of the set of USS sets. The USS set with the largest USS set index may locate in the last location of the set of USS sets.

The UE 102 may determine PDCCH candidates to be allocated for monitoring in a slot in an ascending order of USS set index configured within the slot until a total number of counted PDCCH candidates to be allocated for monitoring in the slot reaches a first number and/or a total number of counted non-overlapped CCEs to be allocated for monitoring in the slot reaches a second number. The counted non-overlapped CCEs are the CCEs which are required by the corresponding counted PDCCH candidates. In other words, the UE 102 may monitor a number of counted PDCCH candidates requiring a corresponding number of counted non-overlapped CCEs.

The UE 102 may determine PDCCH candidates to be allocated for monitoring for each USS set according to the order of the USS set in the set A in a slot. For each USS set with the configured search space set index, in a case that the total number of counted PDCCH candidates do not exceed a first number by counting a number of PDCCH candidates configured for the USS set and the total number of counted non-overlapped CCEs do not exceed a second number by counting a number of non-overlapped CCEs configured for the USS set, the number of PDCCH candidates configured for the USS set is counted to the total number of counted PDCCH candidates and the number of non-overlapped CCEs configured for the USS set is counted to the total number of counted non-overlapped CCEs. 'the number of PDCCH candidates configured for the USS set is counted to the total number of counted PDCCH candidates and the number of non-overlapped CCEs configured for the USS set is counted to the total number of counted non-overlapped CCEs' means that the UE 102 may allocate, all the number of PDCCH candidates configured for the USS set for monitoring to the USS set. That is, in this case, the UE 102 may monitor PDCCH in the USS set with the allocated PDCCH candidates for monitoring. In this case, the UE 102 may next determine PDCCH candidates to be allocated for monitoring for a subsequent USS set in the set of USS set. Here, a number of non-overlapped CCEs configured for a USS set means a number of non-overlapped CCEs required by the number of PDCCH candidates configured for the USS set. The number of non-overlapped CCEs may be further determined based on the CCEs which are required by the already allocated PDCCH candidates for monitoring for all search space sets.

In a case that either the total number of counted PDCCH candidates exceeds the first number by counting a number of PDCCH candidates configured for the USS set or the total number of counted non-overlapped CCEs exceeds the second number by counting a number of non-overlapped CCEs configured for the USS set, the number of PDCCH candidates configured for the USS set is not counted to the total number of counted PDCCH candidates and the number of non-overlapped CCEs configured for the USS set is not counted to the total number of counted non-overlapped CCEs. 'the number of PDCCH candidates configured for the USS set is not counted to the total number of counted PDCCH candidates and the number of non-overlapped CCEs configured for the USS set is not counted to the total number of counted non-overlapped CCEs' means that the UE 102 may not allocate the number of PDCCH candidates configured for the USS set for monitoring to the USS set. That is, in this case, the UE 102 may not monitor PDCCH in the USS set since there are not allocated PDCCH candidates for monitoring for the USS set. Moreover, the UE 102 may not further determine PDCCH candidates to be allocated for monitoring for subsequent USS set whose location are after the USS set in the set of the USS sets.

Next, an implementation of how the UE 102 determines to count the PDCCH candidates to be allocated for monitoring per PDCCH monitoring span is illustrated. For a UE 102 configured with the increased PDCCH monitoring capability, the UE 102 may determine to allocate the PDCCH candidates for monitoring per PDCCH monitoring span. For all USS sets existing within the PDCCH monitoring span, the UE 102 may arrange the location of each USS set in a set (a set of USS sets).

The location order (priority order) of respective USS set in the set is determined in an ascending order of the USS set index. Alternatively, or additionally, the location order of respective USS set in the set can be determined based on a RRC information. The RRC information may indicate the location order for each USS set in the set. Alternatively, or additionally, the location order of each USS set can be determined according to first an ascending order of the search space set index associated with a first group of search space set and then an ascending order of the search space set index associated with a second group of search space set. The first group of search space set are those search space sets where PDCCH candidates for DCI format 1_2/DCI format 0_2 are configured to monitor. The second group of search space set are those search space sets where PDCCH candidates for DCI formats other than DCI format 1_2/DCI format 0_2 are configured to monitor.

The UE 102 may sequentially determine PDCCH candidates to be allocated for monitoring in a monitoring span according to the location order of the set within the PDCCH monitoring span until a total number of counted PDCCH candidates to be allocated for monitoring in the PDCCH monitoring span reaches a first number and/or a total number of counted non-overlapped CCEs to be allocated for monitoring in the PDCCH monitoring span reaches a second number. The counted non-overlapped CCEs are the CCEs which are required by the corresponding counted PDCCH candidates. In other words, the UE 102 may monitor a number of counted PDCCH candidates requiring a corresponding number of counted non-overlapped CCEs.

The UE 102 may determine PDCCH candidates to be allocated for monitoring for each USS set according to the location order of the USS set in the set of USS sets in the PDCCH monitoring span. For each USS set with the configured search space set index, in a case that the total number of counted PDCCH candidates do not exceed a first number by counting a number of PDCCH candidates configured for a USS set and the total number of counted non-overlapped CCEs do not exceed a second number by counting a number of non-overlapped CCEs configured for the USS set, the number of PDCCH candidates configured for the USS set is counted to the total number of counted PDCCH candidates and the number of non-overlapped CCEs configured for the USS set is counted to the total number of counted non-overlapped CCEs. In this case, the UE 102 may allocate all the number of PDCCH candidates configured for the USS set for monitoring to the USS set. Next, the UE 102 may determine PDCCH candidates to be allocated for monitoring for a subsequent location of a USS set in the set.

In a case that either the total number of counted PDCCH candidates exceeds the first number by counting a number of PDCCH candidates configured for a USS set or the total number of counted non-overlapped CCEs exceeds the second number by counting a number of non-overlapped CCEs configured for the USS set, the number of PDCCH candidates configured for the USS set is not counted to the total number of counted PDCCH candidates and the number of non-overlapped CCEs configured for the USS set is not counted to the total number of counted non-overlapped CCEs. In this case, the UE 102 may determine PDCCH candidates to be allocated for monitoring for each aggregation level L for the USS set. The number of PDCCH candidates per aggregation level L for the USS set is counted to the total number of counted PDCCH candidates and the number of non-overlapped CCEs per aggregation level L for the USS set is counted to total number of the counted non-overlapped CCEs in a descending order of the values of aggregation level L until the total number of counted PDCCH candidates reaches the first number and/or the total number of counted non-overlapped CCEs reaches the second number.

In other words, the total number of counted PDCCH candidates do not exceed a first number by counting a number of PDCCH candidates of an aggregation level L for the USS set and the total number of counted non-overlapped CCEs do not exceed a second number by counting a number of non-overlapped CCEs configured for the aggregation level L for the USS set, the number of PDCCH candidates with the aggregation level L configured for the USS set is counted to the total number of counted PDCCH candidates and the corresponding number of non-overlapped CCEs for the number of PDCCH candidates with the aggregation level L configured for the USS set is counted to the total number of counted non-overlapped CCEs. The UE 102 may allocate the PDCCH candidate of the aggregation level L for monitoring to the USS set. The UE 102 may monitor PDCCH in the USS set with the allocated PDCCH candidates of the aggregation level L for monitoring. However, either the total number of counted PDCCH candidates exceeds a first number by counting a number of PDCCH candidates of an aggregation level L for the USS set or the total number of counted non-overlapped CCEs exceed a second number by counting a number of non-overlapped CCEs configured for the aggregation level L for the USS set, the number of PDCCH candidates with the aggregation level L configured for the USS set is not counted to the total number of counted PDCCH candidates and the corresponding number of non-overlapped CCEs for the number of PDCCH candidates with the aggregation level L configured for the USS set is not counted to the total number of counted non-overlapped CCEs. In this case, the UE 102 may not allocate the PDCCH candidate of the aggregation level L for monitoring to the USS set.

Alternatively, or additionally, UE 102 may determine a location of combination of (USS set index, aggregation level (AL) L) in a set. The location order of each combination of (USS set index, L) in the set can be determined, first, in an descending order of the values of aggregation level L for each search space set, second, in an ascending order of search space set index. For example, the largest aggregation level for the USS set with the lowest USS set index may locate in the first location in the set. The secondary largest aggregation level for the USS set with the lowest USS set index may locate in the second location in the set. The USS set with the largest USS set index may locate in the last location of the set of USS sets. Herein, the aggregation level L means the aggregation level for which a non-zero number of PDCCH candidates are provided.

Then, the UE 102 may sequentially determine PDCCH candidates corresponding to each combination of (USS set index, L) to be allocated for monitoring in a PDCCH monitoring span according to the location order of the combination of (USS set index, aggregation level L) in the set. For each combination of (USS set index, L) in the set, in a case that the total number of counted PDCCH candidates do not exceed a first number by counting a number of PDCCH candidates corresponding to a combination of (USS set index, L) and the total number of counted non-overlapped CCEs do not exceed a second number by counting a number of non-overlapped CCEs corresponding to the combination of (USS set index, L), the number of PDCCH candidates corresponding to the combination of (USS set index, L) is counted to the total number of counted PDCCH candidates and the number of non-overlapped CCEs corresponding to the combination of (USS set index, L) is counted to the total number of counted non-overlapped CCEs. In this case, the UE 102 may allocate the number of PDCCH candidates corresponding to the combination of (USS set index, L) for monitoring to the USS set. Next, the UE 102 may determine PDCCH candidates to be allocated for monitoring for a subsequent location of a combination of (USS set index, L) in the set.

In a case that either the total number of counted PDCCH candidates exceeds the first number by counting a number of PDCCH candidates corresponding to a combination of the (USS set index, L) or the total number of counted non-overlapped CCEs exceeds the second number by counting a number of non-overlapped CCEs corresponding to the combination of the (USS set index, L), the number of PDCCH candidates corresponding to the combination of (USS set index, L) is not counted to the total number of counted PDCCH candidates and the number of non-overlapped CCEs corresponding to the combination of the (USS set index, L) is not counted to the total number of counted non-overlapped CCEs. The UE 102 may not allocate the PDCCH candidates corresponding to the combination of the (USS set index, L) for monitoring to the USS set. The UE 102 may drop (not monitor) the PDCCH candidates corresponding to any subsequent location of the combination of the (USS set index, L) in the set.

The UE 102 may perform 508 to monitor allocated PDCCH candidates for corresponding search space set within the first duration. The allocated PDCCH candidates for corresponding search space set is determined based on 506.

As above-mentioned, for each DL BWP configured to a UE 102 in a serving cell, the UE 102 may receive, from a base station, a RRC message including one or more RRC parameters related to search space configuration. RRC parameter(s) related to search space configuration. The number of search space set per DL BWP in a serving cell limits to a number A. In other words, the base station may not configure the UE with a number of search space set being larger than the number A. A UE 102 may indicate a capability to support that, search space sets which have identical PDCCH monitoring occasions within a slot may be counted as one. That is, the UE 102 may indicate a capability to support that the actual number of configured search space set can be larger than the number A and may be increased to a number B. In other words, the UE 102 may indicate a capability, to the base station 160, that the number of configured search space set can be larger than the number A in a case that the search space sets have identical PDCCH monitoring occasions within a slot. In this case, after receiving the capability reported from the UE 102, the base station 160 may configure the UE with a number of search space set being larger than the number A by configuring some search space set with same PDCCH monitoring occasions within a slot.

The search space sets which have identical PDCCH monitoring occasions may be associated with same CORESET. The search space sets which have identical PDCCH monitoring occasions may occupy the same symbols within the slot.

DCI formats (or DCI) may be clarified as DCI format 0_0, DCI format 1_0, DCI format 1_1 (DCI format C), DCI format 0_1 (DCI format D), DCI format 1_2 (DCI format E), DCI format 0_2 (DCI format F), and so on.

DCI format 10 may be used for the scheduling of PDSCH in one cell. A UE may monitor the DCI format 1_0 with CRC scrambled by C-RNTI or CS-RNTI or MCS-C-RNTI or P-RNTI or SI-RNTI or RA-RNTI or TC-RNTI. The UE may monitor the DCI format 0_0 in a CSS (e.g. a CSS set) or a USS (e.g. a USS set). DCI format 0_0 may be used for the scheduling of PUSCH in one cell. A UE may monitor the DCI format 0_0 with CRC scrambled by C-RNTI or CS-RNTI or MCS-C-RNTI or TC-RNTI. The UE may monitor the DCI format 00 in a CSS (e.g. a CSS set) or a USS (e.g. a USS set).

Furthermore, the DCI format 1_0 monitored in a CSS may be used for the scheduling of broadcasting data. The DCI format 1_0 monitored in a CSS may be also used for the scheduling of UE-specific data. The DCI format 00 may be used for the scheduling of UE-specific data.

DCI format 00 may include predefined fields with fixed bits except for the 'Frequency domain resource assignment' field. The fields for DCI format 0_0 sequentially correspond to, 'Identifier for DCI formats' field with 1 bit, 'Frequency domain resource assignment' field, 'Time domain resource assignment' field with 4 bits, 'Frequency hopping flag' field with 1 bit, 'Modulation and coding scheme' field with 5 bits, 'New data indicator' field with 1 bit, 'Redundancy version' field with 2 bits, 'HARQ process number' field with 4 bits, 'TPC command for scheduled PUSCH' field with 2 bits, 'UL/SUL indicator' field with 1 bit. The size of the 'Frequency domain resource assignment' field for DCI format 0_0 may be determined based on a size of a UL bandwidth part. For example, the size of the 'Frequency domain resource assignment' field may be determined based on Formula (1) $\text{ceil}(\log_2(N_{RB}^{UL,BWP}(N_{RB}^{UL,BWP}+1)/2))$ wherein the $N_{RB}^{UL,BWP}$ is a size of UL bandwidth part. The function ceil(x) means the function that takes as input a real number x and gives as output the least integer greater than or equal to x.

DCI format 1_0 may include predefined fields with fixed bits except for the 'Frequency domain resource assignment' field. The fields for DCI format 1_0 sequentially correspond to, 'Identifier for DCI formats' field with 1 bit, 'Frequency domain resource assignment' field, 'Time domain resource assignment' field with 4 bits, 'VRB-to-PRB mapping' field with 1 bit, 'Modulation and coding scheme' field with 5 bits, 'New data indicator' field with 1 bit, 'Redundancy version' field with 2 bits, 'HARQ process number' field with 4 bits, 'Downlink assignment index' field with 2 bits, 'TPC command for scheduled PUCCH' field with 2 bits, 'PUCCH resource indicator' field with 3 bits, 'PDSCH-to-HARQ_ feedback timing indicator' field with 3 bits. The size of the 'Frequency domain resource assignment' field for DCI format 1_0 may be determined based on a size of a DL bandwidth part, and/or a size of CORESET 0. For example, the size of the 'Frequency domain resource assignment' field may be determined based on Formula (2) ceil($\log_2$ ($N_{RB}^{DL,BWP}$ ($N_{RB}^{DL,BWP}$+1)/2)) wherein the $N_{RB}^{DL,BWP}$ is a size of UL bandwidth part or a size of CORESET 0.

DCI format 0_0 and DCI format 1_0 can be configured to be monitored in a CSS (e.g. a CSS set) or a USS (e.g. a USS set). The DCI format 0_0 and DCI format 1_0 being monitored in a CSS may be also called as default DCI formats. In other words, the DCI format 0_0 and DCI format 1_0 being monitored in a USS may not be called as default DCI formats.

DCI format C may refer to DCI format (e.g. DCI format 1_1) monitored in a USS. DCI format C (DCI format 1_1) may be used for the scheduling of PDSCH in one cell. DCT format 1_1 may schedule up to two transport blocks for one PDSCH. A UE may monitor the DCI format 1_1 with CRC scrambled by C-RNTI or CS-RNTI or MCS-C-RNTI. The UE may monitor the DCI format 1_1 in a USS The UE may not monitor the DCI format 1_1 in a CSS. DCI format 1_1 may be used for the scheduling of UE-specific data. DCI format 1_1 may include a plurality of fields with fixed bits and a plurality of fields with variable bits. The size of fields with variable bits are determined based on corresponding RRC configuration.

DCI format D may refer to DCI format (e.g. DCI format 0_1) monitored in a USS. DCI format 0_1 may be used for the scheduling of PUSCH in one cell. DCI format 0_1 may schedule up to two transport blocks for one PUSCH. A UE may monitor the DCI format 0_1 with CRC scrambled by C-RNTI or CS-RNTI or SP-CSI-RNTI or MCS-C-RNTI. The UE may monitor the DCI format 0_1 in a USS. The UE may not monitor the DCI format 0_1 in a CSS. DCI format 01 may be used for the scheduling of UE-specific data. DCI format 0_1 may include a plurality of fields with fixed bits and a plurality of fields with variable bits. The size of fields with variable bits are determined based on corresponding RRC configuration.

DCI format E may refer to DCI format (e.g. DCI format 12) monitored in a USS. DCI format 12 may be used for the scheduling of PDSCH in one cell. DCI format 1_2 may schedule one transport block for one PDSCH. A UE may monitor the DCI format 1_2 in a USS. The UE may not monitor the DCI format 1_2 in a CSS. DCI format 1_2 may be used for the scheduling of UE-specific data. DCI format 1_2 may include a plurality of fields with fixed bits and a plurality of fields with variable bits. The size of fields with variable bits are determined based on corresponding RRC configuration. DCI format 1_2 may not consist of some fields (e.g. 'CBG transmission information' field), which may be present in DCI format 1_1.

DCI format F may refer to DCI format (e.g. DCI format 0_2) monitored in a USS. DCI format 02 may be used for the scheduling of PUSCH in one cell. DCI format 0_2 may schedule one transport block for one PUSCH. Additionally, UE may monitor the DCI format F with CRC scrambled by C-RNTI or CS-RNTI or SP-CSI-RNTI or MCS-C-RNTI. The UE may monitor the DCI format 0_2 in a USS. The UE may not monitor the DCI format 0_2 in a CSS. DCI format 02 may be used for the scheduling of UE-specific data. DCI format 0_2 may include a plurality of fields with fixed bits and a plurality of fields with variable bits. The size of fields with variable bits are determined based on corresponding RRC configuration. DCI format 0_2 may not consist of some fields (e.g. 'CBG transmission information' field), which may be present in DCI format 0_1.

DCI formats C and D may be used to schedule traffic service data (e.g. eMBB). For example, DCI format C may be used to schedule a first PDSCH transmitting eMBB data. DCI format D may be used to schedule a first PUSCH transmitting eMBB data.

DCI formats E and F may be used to schedule traffic service data (e.g. URLLC). For example, DCI format E may be used to schedule a second PDSCH transmitting URLLC data. DCI format F may be used to schedule a second PUSCH transmitting URLLC data. Additionally or alternatively, DCI formats E and F may be DCI formats with CRC scrambled by a second RNTI which is different from a first RNTI(s) for DCI formats C and D. That is, DCI format E may be a DCI format 1_1 with CRC scrambled by a second RNTI. DCI format C may be a DCI format 1_1 with CRC scrambled by a first RNTI (e.g. C-RNTI). DCI format F may be a DCI format 0_1 with CRC scrambled by a second RNTI. DCI format D may be a DCI format 0_1 with CRC scrambled by a first RNTI (e.g. C-RNTI).

Additionally or alternatively, DCI formats C and D may be transmitted in a first CORESET, while DCI formats E and F may be transmitted in a second CORESET which is different from the first CORESET. A RRC parameter, which is used to identity the DCI formats configured by dci-Formats are DCI formats C and D or DCI formats E and F, may be present (or set to 'enable') in a CORESET configuration for the second CORESET. The RRC parameter may be absent (or set to 'disable') in a CORESET configuration for the first CORESET. As mentioned above, a CORESET is associated with a search space set s, in which DCI formats are configured to monitor. For example, dci-Formats may indicate to monitor PDCCH candidates for DCI format 0_1 and DCI format 1_1 in search space set s. If the RRC parameter is absent in the CORESET configuration for the associated CORESET, the DCI format 0_1 and DCI format 1_1 monitored in the CORESET may refer to DCI format C and D. If the RRC parameter is present in the CORESET configuration for the associated CORESET, the DCI format 0_1 and DCI format 1_1 monitored in the CORESET may refer to DCI format E and F. That is, the DCI format C and D may be the DCI format 0_1 and DCI format 1_1 monitored in the first CORESET. The DCI format C and D may be the DCI format 0_1 and DCI format 1_1 monitored in the second CORESET.

Additionally or alternatively, DCI formats C and D may be transmitted in a first search space set s, while DCI formats E and F may be transmitted in a second search space set s which is different from the first search space set s. A RRC parameter, which is used to identity the DCI formats configured by dci-Formats are DCI formats C and D or DCI formats E and F, may be present (or set to 'enable') in ue-Specific (SearchSpace, or SearchSpace-v16) for the second search space set s. The RRC parameter may be absent (or set to 'disable') in ue-Specific (SearchSpace, or SearchSpace-v16) for the first search space set s. For example, dci-Formats may indicate to monitor PDCCH candidates for DCI format 0_1 and DCI format 1_1 in search space set s. If the RRC parameter is absent in ue-Specific for the search space set s, the DCI format 0_1 and DCI format 1_1 monitored in the search space set s may refer to DCI format C and D. If the RRC parameter is present in ue-Specific for the search space set s, the DCI format 0_1 and DCI format 1_1 monitored in the search space set s may refer to DCI format E and F. That is, the DCI format C and D may be the DCI format 0_1 and DCI format 1_1 configured in the first search space set s. The DCI format E and F may be the DCI format 0_1 and DCI format 1_1 configured in the second search space set s.

DCI (format) used for the downlink scheduling is also referred to as downlink grant or downlink assignment. DCI (format) used for the uplink scheduling is also referred to as uplink grant or uplink assignment.

Different DCI formats (DCI) may consist of different fields. The fields defined in the DCI formats maybe mapped to a number of information bits. Each field may be mapped to 0, 1, or more bits of the information bits. That is, a field may include 0, 1, or more bits of the information bits. In a case that a field is mapped to 0 bit, the UE may determine the field is absent in the DCI format. In other words, if a field is mapped to 1, or more bits, the UE may determine the field is present in the DCI format. Furthermore, a field may also include 0, 1, or more zero-padding bit(s). If the number of the information bits in DCI format is less than 12 bits, zero may be appended to the DCI format until the payload size equals 12. A DCI format may include a plurality of fields and 0, 1, or more zero-padding bit(s). The payload size of a DCI format may be equal to a quantity of the information bits and zero-padding bits(s). The number of the zero-padding bits may be 0, 1, or more bits for a DCI format. Herein, the size of a DCI format (DCI format size, DCI size) may refer to the payload size of the DCI format. Alternatively, or additionally, the size of a DCI format may also refer to the size of the information bits of the DCI format.

Figure 8:
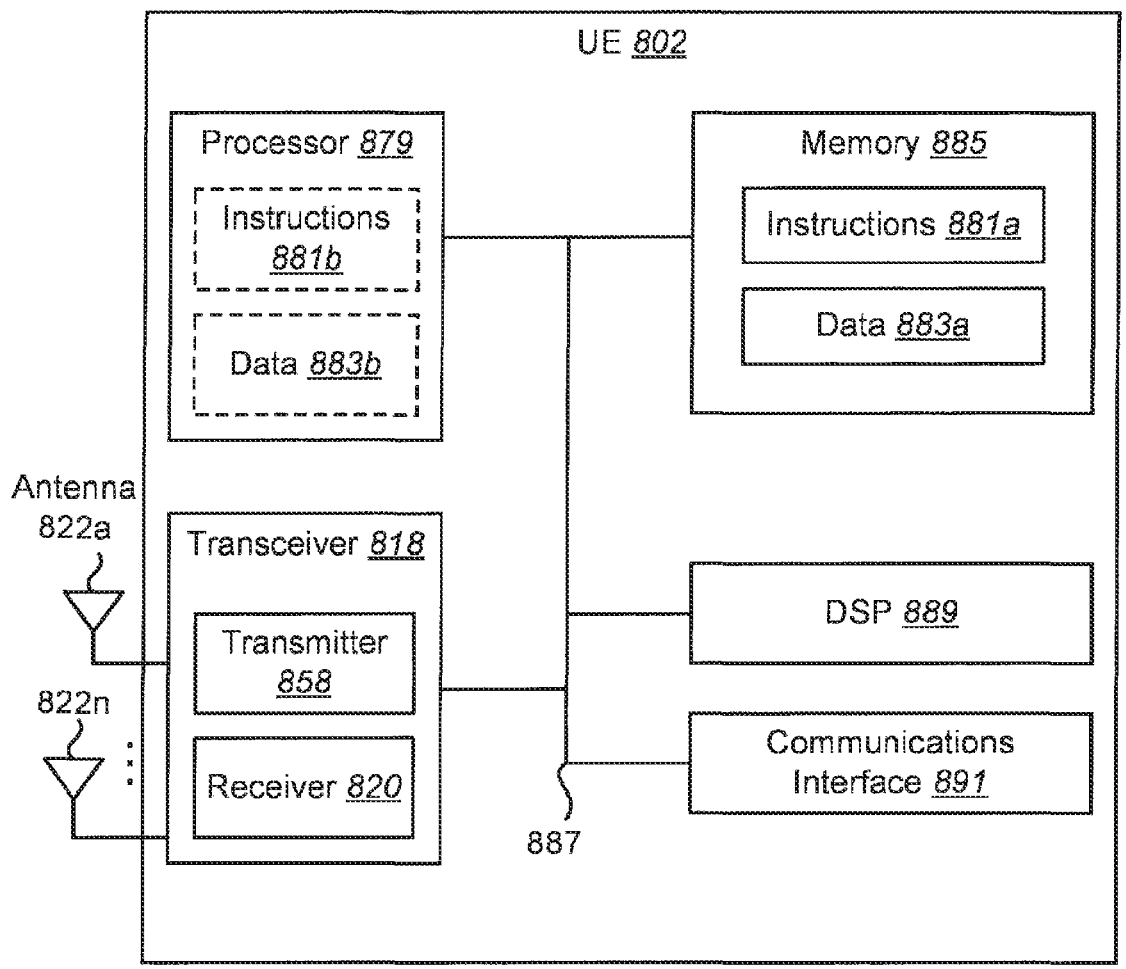
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 881 that controls operation of the UE 802. The processor 881 may also be referred to as a central processing unit (CPU). Memory 887, which may include read-only memory (ROM), random access memory (RAM), a combination of the two or any type of device that may store information, provides instructions 883a and data 885a to the processor 881. A portion of the memory 887 may also include non-volatile random access memory (NVRAM). Instructions 883b and data 885b may also reside in the processor 881. Instructions 883b and/or data 885b loaded into the processor 881 may also include instructions 883a and/or data 885a from memory 887 that were loaded for execution or processing by the processor 881. The instructions 883b may be executed by the processor 881 to implement one or more of the methods 200 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 889, which may include a power bus, a control signal bus and a status signal bus, in addition to a data bus. However, for the sake of clarity, the various buses are illustrated in FIG. 8 as the bus system 889. The UE 802 may also include a digital signal processor (DSP) 891 for use in processing signals. The UE 802 may also include a communications interface 893 that provides user access to the functions of the UE 802. The UE 802 illustrated in FIG. 8 is a functional block diagram rather than a listing of specific components.

Figure 9:
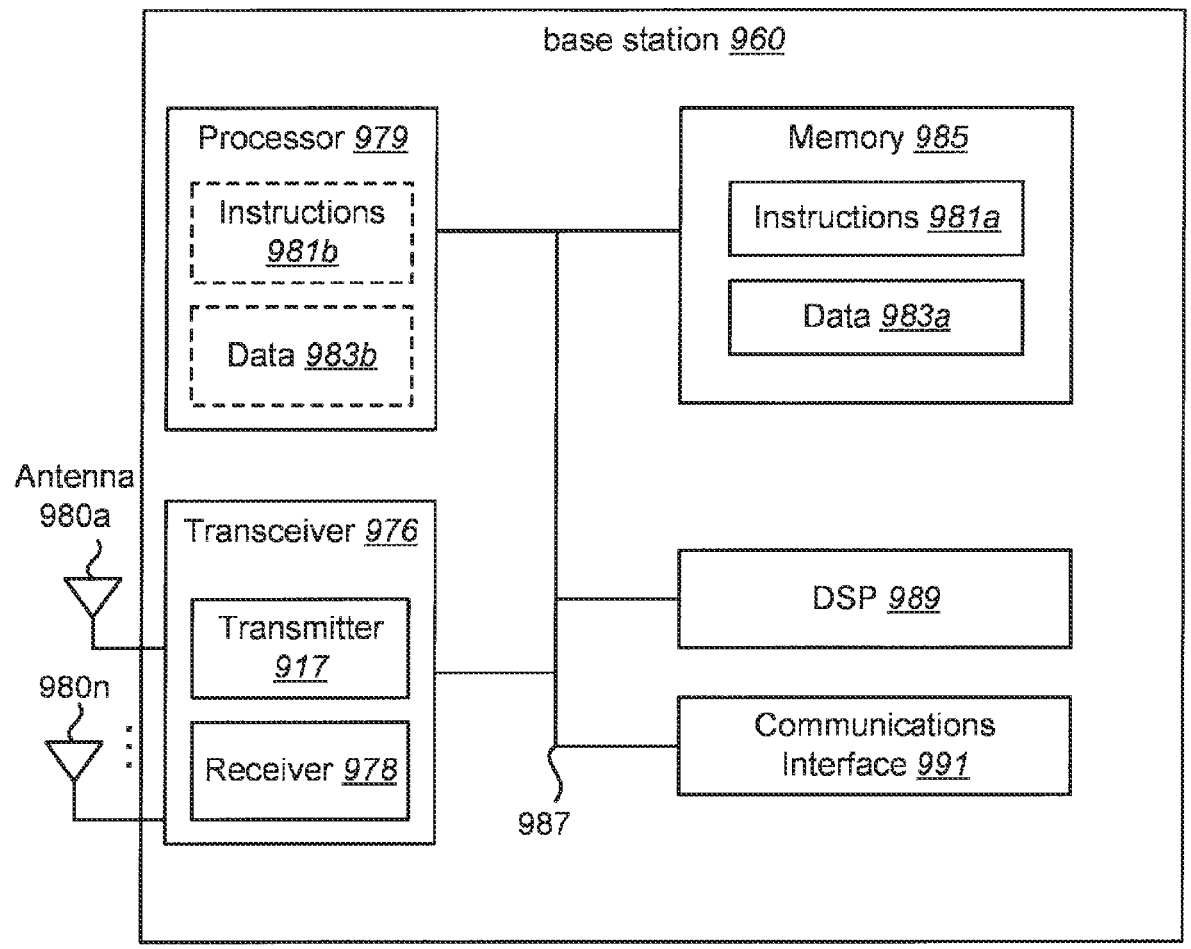
FIG. 9 illustrates various components that may be utilized in a base station.

FIG. 9 illustrates various components that may be utilized in a base station 960. The base station 960 described in connection with FIG. 9 may be implemented in accordance with the base station 160 described in connection with FIG. 1. The base station 960 includes a processor 981 that controls operation of the base station 960. The processor 981 may also be referred to as a central processing unit (CPU). Memory 987, which may include read-only memory (ROM), random access memory (RAM), a combination of the two or any type of device that may store information, provides instructions 983a and data 985a to the processor 981. A portion of the memory 987 may also include non-volatile random access memory (NVRAM). Instructions 983b and data 985b may also reside in the processor 981. Instructions 983b and/or data 985b loaded into the processor 981 may also include instructions 983a and/or data 985a from memory 987 that were loaded for execution or processing by the processor 981. The instructions 983b may be executed by the processor 981 to implement one or more of the methods 300 described above.

The base station 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the base station 960 are coupled together by a bus system 989, which may include a power bus, a control signal bus and a status signal bus, in addition to a data bus. However, for the sake of clarity, the various buses are illustrated in FIG. 9 as the bus system 989. The base station 960 may also include a digital signal processor (DSP) 991 for use in processing signals. The base station 960 may also include a communications interface 993 that provides user access to the functions of the base station 960. The base station 960 illustrated in FIG. 9 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE) comprising:
   transmission circuitry configured to transmit, to a base station, capability information indicating multiple combinations (X,Y) for PDCCH monitoring, wherein each combination (X,Y) is associated with a respective maximum number of PDCCH candidates, a span is a number of consecutive OFDM symbols where the UE is configured to monitor PDCCH in a slot, and Y is a maximum number of the span which the UE can be configured with;
   reception circuitry configured to receive configurations of search space sets to determine a set of spans, the search space sets including CSS set(s) and USS set(s); and
   control circuitry configured to determine, from the multiple combinations (X,Y), one or more combinations (X,Y) wherein each value of X of the one or more combinations (X, Y) is equal to or less than values among separations of every two consecutive spans within the set of spans, and to determine, from the one or more combinations (X,Y), a combination (X,Y) with a largest maximum number of PDCCH candidates for the PDCCH monitoring, wherein
   the reception circuitry is further configured to, for the PDCCH monitoring in the span,
       monitor the PDCCH candidates of the CSS set(s) configured in the span, and
       determine whether to monitor the PDCCH candidates of the USS set(s) configured in the span based on the maximum number of the PDCCH candidates of the combination (X,Y) per span and the number of the PDCCH candidates of the CSS set(s) configured in the span.

2. The UE according to claim 1, wherein
   a same combination (X,Y) with different subcarrier spacing (SCS) configuration is associated with different maximum number of PDCCH candidates.

3. A base station comprising:
   reception circuitry configured to receive, from a user equipment (UE), capability information indicating multiple combinations (X,Y) for PDCCH monitoring, wherein each combination (X,Y) is associated with a respective maximum number of PDCCH candidates, a span is a number of consecutive OFDM symbols where the UE is configured to monitor PDCCH in a slot, and Y is a maximum number of the span which the UE can be configured with;
   transmission circuitry configured to transmit configurations of search space sets to determine a set of spans, the search space sets including CSS set(s) and USS set(s);
   control circuitry configured to determine, from the multiple combinations (X,Y), one or more combinations (X,Y) wherein each value of X of the one or more combinations (X, Y) is equal to or less than values among separations of every two consecutive spans within the set of spans, and to determine, from the one or more combinations (X,Y), a combination (X,Y) with a largest maximum number of PDCCH candidates for the PDCCH monitoring, wherein
   the transmission circuitry is further configured to, for the PDCCH monitoring in the span,
       transmit PDCCH candidates of the CSS set(s) configured in the span, and
       determine whether to transmit the PDCCH candidates of the USS set(s) configured in the span based on the maximum number of PDCCH candidates of the combination (X,Y) per span and the number of the PDCCH candidates of the CSS set(s) configured in the span.

4. The base station according to claim 3, wherein
   a same combination (X,Y) with different subcarrier spacing (SCS) configuration is associated with different maximum number of PDCCH candidates.

5. A method by a user equipment (UE), the method comprising:
   transmitting, to a base station, capability information indicating multiple combinations (X,Y) for PDCCH monitoring, wherein each combination (X,Y) is associated with a respective maximum number of PDCCH candidates, a span is a number of consecutive OFDM symbols where the UE is configured to monitor PDCCH in a slot, and Y is a maximum number of the span which the UE can be configured with;
   receiving configurations of search space sets to determine a set of spans, the search space sets including CSS set(s) and USS set(s);
   determining, from the multiple combinations (X,Y), one or more combinations (X,Y) wherein each value of X of the one or more combinations (X, Y) is equal to or less than values among separations of every two consecutive spans within the set of spans;
   determining, from the one or more combinations (X,Y), a combination (X,Y) with a largest maximum number of PDCCH candidates for the PDCCH monitoring;
   monitoring, for the PDCCH monitoring in the span, the PDCCH candidates of the CSS set(s) configured in the span; and
   determining, for the PDCCH monitoring in the span, whether to monitor the PDCCH candidates of the USS set(s) configured in the span based on the maximum number of PDCCH candidates of the combination (X,Y) per span and the number of the PDCCH candidates of the CSS set(s) configured in the span.

* * * * *